(12) United States Patent
Yoshinaga

(10) Patent No.: US 12,490,709 B2
(45) Date of Patent: Dec. 9, 2025

(54) EXCREMENT TREATMENT MATERIAL AND METHOD FOR MANUFACTURING THE SAME

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 763 days.

(21) Appl. No.: 17/837,414

(22) Filed: Jun. 10, 2022

(65) Prior Publication Data

US 2022/0295738 A1    Sep. 22, 2022

Related U.S. Application Data

(63) Continuation of application No. PCT/JP2021/004241, filed on Feb. 5, 2021.

(30) Foreign Application Priority Data

Apr. 15, 2020  (JP) ................................ 2020-072651

(51) Int. Cl.
*A01K 1/015* (2006.01)
*C04B 28/14* (2006.01)
*C04B 111/00* (2006.01)

(52) U.S. Cl.
CPC ............ *A01K 1/0155* (2013.01); *C04B 28/14* (2013.01); *C04B 2111/0062* (2013.01)

(58) Field of Classification Search
None
See application file for complete search history.

(56) References Cited

U.S. PATENT DOCUMENTS

| | | | | |
|---|---|---|---|---|
| 12,324,406 | B2* | 6/2025 | Yoshinaga | A01K 1/0114 |
| 2015/0360202 | A1* | 12/2015 | Ito | B01J 20/045 |
| | | | | 252/194 |
| 2024/0381834 | A1* | 11/2024 | Yoshinaga | A01K 1/015 |
| 2025/0143252 | A1* | 5/2025 | Yoshinaga | A01K 1/0155 |

FOREIGN PATENT DOCUMENTS

| | | |
|---|---|---|
| JP | 2005-110700 A | 4/2005 |
| JP | 2005-312440 A | 11/2005 |
| JP | 2006-042825 A | 2/2006 |
| JP | 3768203 B2 | 4/2006 |
| JP | 2012-147694 A | 8/2012 |
| JP | 2014-018187 A | 2/2014 |
| JP | 2017-123808 A | 7/2017 |
| WO | 2014/162599 A1 | 10/2014 |

OTHER PUBLICATIONS

Apr. 20, 2021 International Search Report issued in International Patent Application No. PCT/JP2021/004241.
Apr. 20, 2021 Written Opinion of the International Searching Authority issued in International Patent Application No. PCT/JP2021/004241.
Aug. 9, 2024 Office Action issued in Japanese Patent Application No. 2020-072651.
Aug. 30, 2023 Office Action issued in Chinese Patent Application No. 202180007509.7.

* cited by examiner

*Primary Examiner* — John J Figueroa
(74) *Attorney, Agent, or Firm* — Oliff PLC

(57) ABSTRACT

An excrement treatment material is composed of a grain that has a water-repellent property. The grain contains a water-absorbent material as a first main material, and contains gypsum as a second main material.

20 Claims, 1 Drawing Sheet

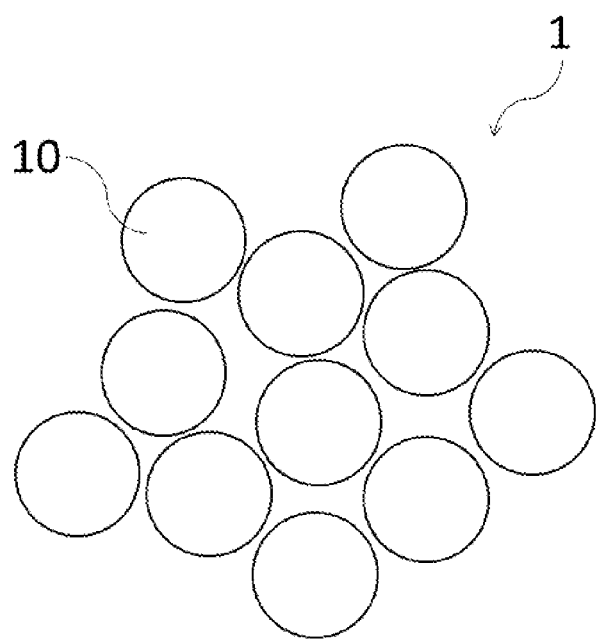

EXCREMENT TREATMENT MATERIAL AND METHOD FOR MANUFACTURING THE SAME

CROSS REFERENCE TO RELATED APPLICATION

This is a Continuation of International Application No. PCT/JP2021/004241 filed Feb. 5, 2021, which claims the benefit of Japanese Application No. 2020-072651 filed Apr. 15, 2020. The contents of these applications are hereby incorporated by reference in their entirety.

TECHNICAL FIELD

The present invention relates to an excrement treatment material and a method for manufacturing the same.

BACKGROUND ART

A conventional excrement treatment material is disclosed in, for example, Patent Document 1. The excrement treatment material disclosed in Patent Document 1 is composed of a plurality of grains that have a water-repellent property, and is laid in a pet toilet. The pet toilet is divided into an upper space and a lower space by a mesh sheet that allows urine to pass therethrough. The water-repellent grains are disposed in the upper space. A liquid-absorbing sheet is disposed in the lower space. When a pet urinates, the urine passes through gaps between the water-repellent grains, and arrives in the lower space through the mesh sheet. The urine having arrived in the lower space is absorbed by the liquid-absorbing sheet.

PATENT DOCUMENT

Patent Document 1: JP 2005-110700 A

SUMMARY OF INVENTION

Technical Problem

The water-repellent excrement treatment material does not absorb urine at all or, if any, hardly absorbs it, and therefore is capable of being used repeatedly, unlike a water-absorbing excrement treatment material. However, in a case where grains are formed using a water-absorbent material such as papers as a main material, the surfaces of the grains need to be subjected to water-repellent treatment in order for the grains to have a water-repellent property. This is a factor that complicates a manufacturing process of the excrement treatment material.

Solution to Problem

The present invention has been made in view of the above-described problem, and it is an object thereof to provide an excrement treatment material that is capable of exhibiting a water-repellent property without water-repellent treatment, and a method for manufacturing the same.

An excrement treatment material according to the present invention is composed of a grain that has a water-repellent property. The grain contains a water-absorbent material as a first main material, and contains gypsum as a second main material.

In the excrement treatment material, a water-absorbent material is used as the first main material of the grain, and gypsum is used as the second main material. The first main material is such a material that the weight ratio of the material with respect to the grain is highest and 50% or more. Also, the second main material is such a material that the weight ratio of the material with respect to the grain is equal to the first main material or second highest after the first main material, and 30% or more. Using gypsum as the second main material in this way can enhance the water-repellent rate of the grain. For this reason, regardless of using a water-absorbent material as the first main material, it is possible to obtain the grain that has a water-repellent property without subjecting the surface of the grain to water-repellent treatment.

A method for manufacturing an excrement treatment material according to the present invention is a method for manufacturing an excrement treatment material composed of a grain that has a water-repellent property. The method includes a grain forming step of forming the grain that contains a water-absorbent material as a first main material, and contains gypsum as a second main material.

In the manufacturing method, a water-absorbent material is used as the first main material of the grain, and gypsum is used as the second main material. Using gypsum as the second main material in this way can enhance the water-repellent rate of the grain. For this reason, regardless of using a water-absorbent material as the first main material, it is possible to obtain the grain that has a water-repellent property without subjecting the surface of the grain to water-repellent treatment.

Advantageous Effects of Invention

According to the present invention, it is possible to implement an excrement treatment material that is capable of exhibiting a water-repellent property without water-repellent treatment, and a method for manufacturing the same.

BRIEF DESCRIPTION OF DRAWINGS

FIG. 1 is a schematic view showing an embodiment of an excrement treatment material according to the present invention.

DESCRIPTION OF EMBODIMENTS

Hereinafter, an embodiment of the present invention will be described in detail with reference to the drawings. In the description of the drawings, the same elements are given the same reference numerals, and a redundant description will be omitted.

FIG. 1 is a schematic view showing an embodiment of an excrement treatment material according to the present invention. An excrement treatment material 1 is an excrement treatment material used for treatment of excrement (particularly urine), and composed of a grain 10. In the present embodiment, the excrement treatment material 1 is composed of a plurality of the grains 10. The particle diameter of each of the grains 10 is, for example, between 5 mm and 15 mm inclusive. As used herein, the particle diameter of the grain 10 shall be defined as the diameter of the minimum sphere that can include the grain 10.

The excrement treatment material 1 may be an excrement treatment material for animals that treats excrement of animals such as cats or dogs, or may be an excrement treatment material for humans that treats excrement of humans. The excrement treatment material 1 is used, for example, in a double-structured toilet (system toilet) that is divided into an upper space and a lower space by a partition member having a hole that allows urine to pass therethrough. In that case, the excrement treatment material 1 is used in a state in which the plurality of grains 10 are piled in the upper space (on the partition member) of the system toilet.

Each of the grains 10 has a water-repellent property. That is, the grains 10 have the property of not absorbing liquid such as urine at all or, if any, hardly absorbing it. The grains 10 having the water-repellent property require the water-repellent rate of 80% or more measured by the following test. First, approximate 50 grams of a plurality of the grains 10 (sample) are placed in a strainer. An empty beaker is set under the strainer. Then, 30 ml of water is dripped on the sample over 10 seconds using a syringe without a needle. After waiting 1 minute, the quantity of the water in the beaker is measured. The ratio of the measured water quantity with respect to the quantity of the dripped water (30 ml) shall be the water-repellent rate. That is, if the water quantity in the beaker is 24 ml or more, the water-repellent rate is 80% or more, and therefore the grains 10 are found to have the water-repellent property. For reference, the water-repellent rate of general water-absorbing cat litter, which is commercially available, is about 5%.

Each of the grains 10 contains a water-absorbent material as a first main material. As used herein, the first main material refers to such a material that the weight ratio of the material with respect to each of the grains 10 is highest and 50% or more. The weight ratio of the first main material (water-absorbent material) with respect to each of the grains 10 is between 50% and 70% inclusive. The water-absorbent material is preferably an organic substance. As the water-absorbent material that is an organic substance, for example, papers, used tea leaves, plastics, or bean curd lees can be used. In the present embodiment, the water-absorbent material is not subjected to water-repellent treatment.

The papers refer to a material made mainly of pulp. Examples of the papers include, in addition to ordinary paper, recycled paper, a vinyl chloride wallpaper classified product (paper obtained by classifying vinyl chloride wallpaper), fluff pulp, papermaking sludge, and pulp sludge. As the plastics, for example, a disposable diaper classified product (plastic obtained by classifying disposable diapers) may be used. The bean curd lees are preferably dried bean curd lees.

Each of the grains 10 contains gypsum as a second main material. As used herein, the second main material refers to such a material that the weight ratio of the material with respect to each of the grains 10 is equal to the first main material or second highest after the first main material, and 30% or more. The weight ratio of the second main material (gypsum) with respect to each of the grains 10 is between 30% and 50% inclusive.

Each of the grains 10 contains one or more sub-materials in addition to the first main material and the second main material. As used herein, the sub-material refers to such a material that the weight ratio of the material with respect to each of the grains 10 is 20% or less. In a case where each of the grains 10 contains two or more sub-materials, the total weight ratio of the sub-materials shall be 20% or less.

Each of the grains 10 may contain, for example, one or more materials selected from the group consisting of an adhesive, colorant, a water-repellent agent, and a deodorizing antimicrobial agent as the sub-material(s). Examples of the adhesive include starch such as cornstarch, CMC (carboxymethyl cellulose), PVA (polyvinyl alcohol), and dextrin. The weight ratio of the adhesive with respect to each of the grains 10 is preferably between 1% and 5% inclusive.

Examples of the colorant include chalk powder in addition to general dye and pigment. The weight ratio of the colorant with respect to each of the grains 10 is preferably between 1% and 5% inclusive. Examples of the water-repellent agent include paraffin. The weight ratio of the water-repellent agent with respect to each of the grains 10 is preferably between 0.5% and 2% inclusive. Examples of the deodorizing antimicrobial agent include copper compounds such as copper sulfate, and catechin powder. The weight ratio of the deodorizing antimicrobial agent with respect to each of the grains 10 is preferably between 0.1% and 1% inclusive.

In the present embodiment, each of the grains 10 is a granule obtained by granulating a granulating material (mixture of the first main material, the second main material, and one or more sub-materials). Each of the grains 10 is not provided with a coating layer (a layer that covers a part of or the entirety of the surface of the granule). That is, each of the grains 10 has single-layer structure composed of the homogeneous granule.

Next, an example of a method for manufacturing the excrement treatment material 1 will be described as an embodiment of a method for manufacturing an excrement treatment material according to the present invention. The manufacturing method includes a grain forming step.

The grain forming step is a step of forming the grain 10. In this step, a plurality of granules that will serve as the grains 10 are formed by granulating the granulating material with a granulation apparatus. The granulating material is obtained by uniformly mixing the first main material, the second main material, and one or more sub-materials. In the present embodiment, an extrusion granulator is used as the granulation apparatus. Prior to the granulation, pretreatment such as pulverization, kneading, and adding water is performed on the granulating material as needed. After the granulation, posttreatment such as sieving, and drying is performed as needed. In the present embodiment, the surfaces of the granules are not subjected to water-repellent treatment after the granulation. Accordingly, the excrement treatment material 1 composed of the plurality of grains 10 is obtained.

The effects of the present embodiment will be described. In the present embodiment, a water-absorbent material is used as the first main material of the grains 10, and gypsum is used as the second main material. Using gypsum as the second main material in this way can enhance the water-repellent rate of the grains 10. That is because a large amount of (30 wt. % or more of) gypsum functions as a solidifying agent, and thereby crevices become less likely to form on the surface or in the inside of the grains 10. The crevices serve as a path through which moisture such as urine enters inside the grains 10, and therefore are a factor that decreases the water-repellent rate of the grains 10. For this reason, regardless of using a water-absorbent material as the first main material, it is possible to obtain the grains 10 that have a water-repellent property without subjecting the surfaces of the grains 10 to water-repellent treatment. Accordingly, the excrement treatment material 1 that is capable of exhibiting a water-repellent property without water-repellent treatment, and the method for manufacturing the same are implemented.

Incidentally, it can also be considered to increase the pressure applied to the granulating material during granulation as a means of making crevices unlikely to form on the surface or in the inside of the grains 10. In a case where the grains 10 do not contain gypsum at all or the grains 10 contain only a small amount of (20 wt. % or less of) gypsum, the above-described means needs to be used in order to obtain the grains 10 having a water-repellent property without subjecting the surfaces to water-repellent treatment. However, in that case, it is necessary to increase the resistance that the granulating material receives when passing through a through hole of a die by enlarging the length or reducing the diameter of the through hole. For that reason, there is a problem that the through hole becomes more likely to be clogged with the granulating material. In this regard, according to the present embodiment, the grains 10 having a water-repellent property can be obtained even though the pressure during granulation is scarcely increased, because a large amount of gypsum makes crevices unlikely to form on the surface or in the inside of the grains 10. Therefore, it is possible to avoid the above-described problem due to increasing the pressure during granulation.

In the case where the water-absorbent material is an organic substance, the greater part of the grains 10 can be disposed of by incineration. This contributes to convenience for disposal of used grains 10. Particularly in the case where recycled paper is used as the water-absorbent material, it is possible to contribute to effective use of waste paper.

The grains 10 contain the sub-material(s) in addition to the first main material and the second main material. Thus, it is possible to impart various functions to the grains 10, and enhance performance of the grains 10.

In the case where the grains 10 contain an adhesive as the sub-material, granulation of the grains 10 becomes easier. Moreover, it is possible to make a situation less likely to occur in which the grains 10 collapse after granulation.

In the case where the grains 10 contain colorant as the sub-material, it is possible to impart a desired color to the grains 10. This contributes to improvement of aesthetic appearance of the grains 10 and eventually the excrement treatment material 1.

In the case where the grains 10 contain a water-repellent agent as the sub-material, the water-repellent property of the grains 10 can be further enhanced.

In the case where the grains 10 contain a deodorizing antimicrobial agent as the sub-material, it is possible to restrain propagation of various germs and generation of malodors in the grains 10 to which urine adheres.

In order to confirm the effects of the present embodiment, the excrement treatment material 1 was manufactured actually by the manufacturing method described above. The composition of each of the manufactured grains 10 was as follows.

water-absorbent material (first main material) . . . 53.5 wt. %
gypsum (second main material) . . . 40.0 wt. %
adhesive (sub-material) . . . 2.5 wt. %
colorant (sub-material) . . . 2.5 wt. %
water-repellent agent (sub-material) . . . 1.0 wt. %
deodorizing antimicrobial agent (sub-material) . . . 0.5 wt. %

As the water-absorbent material, recycled paper was used. The recycled paper was unused (as recycled paper). That is, the recycled paper used there was not obtained by being separated from a product such as vinyl chloride wallpaper after being used for the product. As the adhesive, the colorant, and the water-repellent agent, 8-cornstarch, chalk powder, and paraffin were used, respectively. Also, as the deodorizing antimicrobial agent, copper sulfate (0.4 wt. %) and catechin powder (0.1 wt. %) were used. The water-repellent rate of the grains 10 measured by the test described above was 86%. In this way, the manufactured excrement treatment material 1 exhibited a sufficient water-repellent property.

Considering the above-described mechanism that gypsum contributes to the water-repellent property of the grains 10, it is expected that similar result can be obtained even if the content (weight ratio) of the water-absorbent material or the gypsum changes by about plus/minus 5%. Therefore, the weight ratio of the water-absorbent material with respect to each of the grains 10 is preferably between 51% and 56% inclusive. Also, the weight ratio of the gypsum with respect to each of the grains 10 is preferably between 38% and 42% inclusive.

The present invention is not limited to the above-described embodiment, and various modifications can be made. In the above-described embodiment, an example is given in which the grains 10 contain the sub-material. However, it is not essential that the grains 10 contain the sub-material. That is, each of the grains 10 may contain only the first main material (water-absorbent material) and the second main material (gypsum).

LIST OF REFERENCE NUMERALS

1 Excrement Treatment Material
10 Grain

The invention claimed is:

1. An excrement treatment material composed of a grain that has a water-repellent property,
   wherein the grain contains a water-absorbent material as a first main material, and contains gypsum as a second main material, and
   wherein the grain has a water-repellent rate of 80% or more.

2. The excrement treatment material according to claim 1, wherein the water-absorbent material is an organic substance.

3. The excrement treatment material according to claim 2, wherein the water-absorbent material is recycled paper.

4. The excrement treatment material according to claim 1, wherein a weight ratio of the water-absorbent material with respect to the grain is from 51% to 56%.

5. The excrement treatment material according to claim 1, wherein a weight ratio of the gypsum with respect to the grain is from 38% to 42%.

6. The excrement treatment material according to claim 1, wherein the grain contains a sub-material in addition to the first main material and the second main material.

7. The excrement treatment material according to claim 6, wherein the grain contains an adhesive as the sub-material.

8. The excrement treatment material according to claim 7, wherein the adhesive is cornstarch.

9. The excrement treatment material according to claim 6, wherein the grain contains colorant as the sub-material.

10. The excrement treatment material according to claim 9, wherein the colorant is chalk powder.

11. The excrement treatment material according to claim 6, wherein the grain contains a water-repellent agent as the sub-material.

12. The excrement treatment material according to claim 11, wherein the water-repellent agent is paraffin.

13. The excrement treatment material according to claim 6, wherein the grain contains a deodorizing antimicrobial agent as the sub-material.

14. The excrement treatment material according to claim 13,
wherein the deodorizing antimicrobial agent is copper sulfate or catechin powder.

15. A method for manufacturing an excrement treatment material composed of a grain that has a water-repellent property, the method comprising:
a grain forming step of forming the grain that contains a water-absorbent material as a first main material, and contains gypsum as a second main material,
wherein the grain has a water-repellent rate of 80% or more.

16. The method for manufacturing an excrement treatment material according to claim 15,
wherein the water-absorbent material is an organic substance.

17. The method for manufacturing an excrement treatment material according to claim 16,
wherein the water-absorbent material is recycled paper.

18. The method for manufacturing an excrement treatment material according to claim 15,
wherein in the grain forming step, the grain is formed that contains a sub-material in addition to the first main material and the second main material.

19. The method for manufacturing an excrement treatment material according to claim 18,
wherein in the grain forming step, the grain is formed that contains an adhesive as the sub-material.

20. The method for manufacturing an excrement treatment material according to claim 18,
wherein in the grain forming step, the grain is formed that contains colorant as the sub-material.

* * * * *